(12) United States Patent
Wang et al.

(10) Patent No.: US 7,711,213 B2
(45) Date of Patent: May 4, 2010

(54) NANOWIRE-BASED MODULATORS

(75) Inventors: Shih-Yuan Wang, Palo Alto, CA (US);
Scott Corzine, Sunnyvale, CA (US);
Wei Wu, Mountain View, CA (US); Alex Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/699,092

(22) Filed: Jan. 29, 2007

(65) Prior Publication Data

US 2008/0181551 A1    Jul. 31, 2008

(51) Int. Cl.
*G02B 1/035*    (2006.01)
*G02B 1/01*     (2006.01)
*G02B 1/295*    (2006.01)

(52) U.S. Cl. .................... 385/2; 385/1; 385/4; 385/8

(58) Field of Classification Search ............. 385/1–3, 385/8, 37, 10
See application file for complete search history.

(56) References Cited

U.S. PATENT DOCUMENTS

| | | | | |
|---|---|---|---|---|
| 5,077,488 A | * | 12/1991 | Davis | ............ 327/540 |
| 6,081,631 A | * | 6/2000 | Brindel et al. | ............ 385/1 |
| 6,882,051 B2 | * | 4/2005 | Majumdar et al. | ............ 257/746 |
| 7,035,490 B2 | * | 4/2006 | Miyazaki et al. | ............ 385/10 |
| 2003/0128949 A1 | * | 7/2003 | Kitagawa et al. | ............ 385/129 |
| 2004/0150873 A1 | * | 8/2004 | Pearsall | ............ 359/321 |
| 2004/0165815 A1 | * | 8/2004 | Kitagawa | ............ 385/16 |
| 2005/0064618 A1 | * | 3/2005 | Brown et al. | ............ 438/49 |
| 2005/0191774 A1 | * | 9/2005 | Li et al. | ............ 438/22 |
| 2007/0086718 A1 | * | 4/2007 | Aoki et al. | ............ 385/132 |
| 2007/0122313 A1 | * | 5/2007 | Li et al. | ............ 422/100 |
| 2007/0164270 A1 | * | 7/2007 | Majumdar et al. | ............ 257/14 |
| 2007/0235738 A1 | * | 10/2007 | Jin et al. | ............ 257/79 |
| 2007/0267625 A1 | * | 11/2007 | Wang et al. | ............ 257/14 |
| 2008/0006862 A1 | * | 1/2008 | Li et al. | ............ 257/296 |
| 2008/0218740 A1 | * | 9/2008 | Williams et al. | ............ 356/72 |

* cited by examiner

*Primary Examiner*—Uyen-Chau N Le
*Assistant Examiner*—Rhonda S Peace

(57) ABSTRACT

Various embodiments of the present invention are directed to nanowire-based modulators that can be used to encode information in a carrier channel of electromagnetic radiation. In one embodiment of the present invention, the modulator includes a waveguide configured to transmit one or more channels of electromagnetic radiation. The modulator includes a first terminal and a second terminal. The first terminal and the second terminal are positioned on opposite sides of the waveguide. The modulator also includes a number of nanowires, wherein each nanowire interconnects the first terminal to the second terminal and a portion of each nanowire is operatively coupled to the waveguide. The nanowires modulate the one or more channels when an electrical signal of appreciable magnitude is applied to the first terminal and the second terminal.

20 Claims, 10 Drawing Sheets

NANOWIRE-BASED MODULATORS

CROSS REFERENCE TO A RELATED APPLICATION

This application is related in part to a currently co-pending U.S. patent application entitled "Nanowire-based photodetectors," naming Shih-Yuan Wang, Scott Corzine, Wei Wu, and Alex Bratkovski as inventors, and filed concurrently with this application, which is identified as U.S. application Ser. No. 11/699,291.

TECHNICAL FIELD

Embodiments of the present invention are directed to modulators, and, in particular, to nanowire-based modulators that can be used to encode information in channels of electromagnetic radiation.

BACKGROUND

Since the late 1970s, waveguides have increasingly supplanted conventional signal lines for transmitting information. Rather than encoding information in electrical signals and transmitting the encoded electrical signals via signal lines, the same information can be encoded in a channel of electromagnetic radiation and transmitted via waveguides, such as optical fibers, ridge waveguides, and photonic crystal waveguides. The term "channel," also called "optical channel," refers to electromagnetic radiation transmitted at one wavelength through a waveguide. Transmitting information encoded in channels via waveguides has a number of advantages over transmitting encoded electrical signals via signal lines. First, degradation or loss is much less for channels transmitted via waveguides than for electrical signals transmitted via signal lines. Second, waveguides can be fabricated to support a much higher bandwidth than signal lines. For example, a single Cu or Al wire can only transmit a single electrical signal, while a single optical fiber can be configured to transmit about 100 or more channels. Finally, electromagnetic radiation provides, in general, a much higher transmission rate.

Recently, advances in materials science and semiconductor fabrication techniques have made it possible to fabricate waveguides that can be integrated with electronic devices, such as memory and processors, to form photonic integrated circuits ("PICs"), where the waveguides may be used to transmit information encoded in channels between the electronic devices. PICs are the photonic equivalent of electronic integrated circuits and may be implemented on a small wafer of semiconductor material that forms the base of the electronic devices. Unlike electronic integrated circuits where Si is the primary material, PICs may be composed of a variety of materials. For example, PICs may be composed of a single semiconductor, such as Si on an insulator, or binary and ternary semiconductors, such as InP and $Al_xGa_{1-x}As$, where x varies from 0 to 1.

In order to effectively implement PICs, passive and active photonic components are needed. Waveguides and attenuators are examples of passive photonic components that can be fabricated using conventional epitaxial and lithographic methods and may be used to direct the propagation of channels between electronic devices. Physicists, engineers, and computer scientists have recognized a need for active photonic components, such as modulators, that can be used to encode information in channels for distribution to other electronic devices.

SUMMARY

Various embodiments of the present invention are directed to nanowire-based modulators that can be used to encode information in a carrier channel of electromagnetic radiation. In one embodiment of the present invention, the modulator includes a waveguide configured to transmit one or more channels of electromagnetic radiation. The modulator includes a first terminal and a second terminal. The first terminal and the second terminal are positioned on opposite sides of the waveguide. The modulator also includes a number of nanowires, wherein each nanowire interconnects the first terminal to the second terminal and a portion of each nanowire is operatively coupled to the waveguide. The nanowires modulate the one or more channels when an electrical signal of appreciable magnitude is applied to the first terminal and the second terminal.

DETAILED DESCRIPTION

Figure 1:
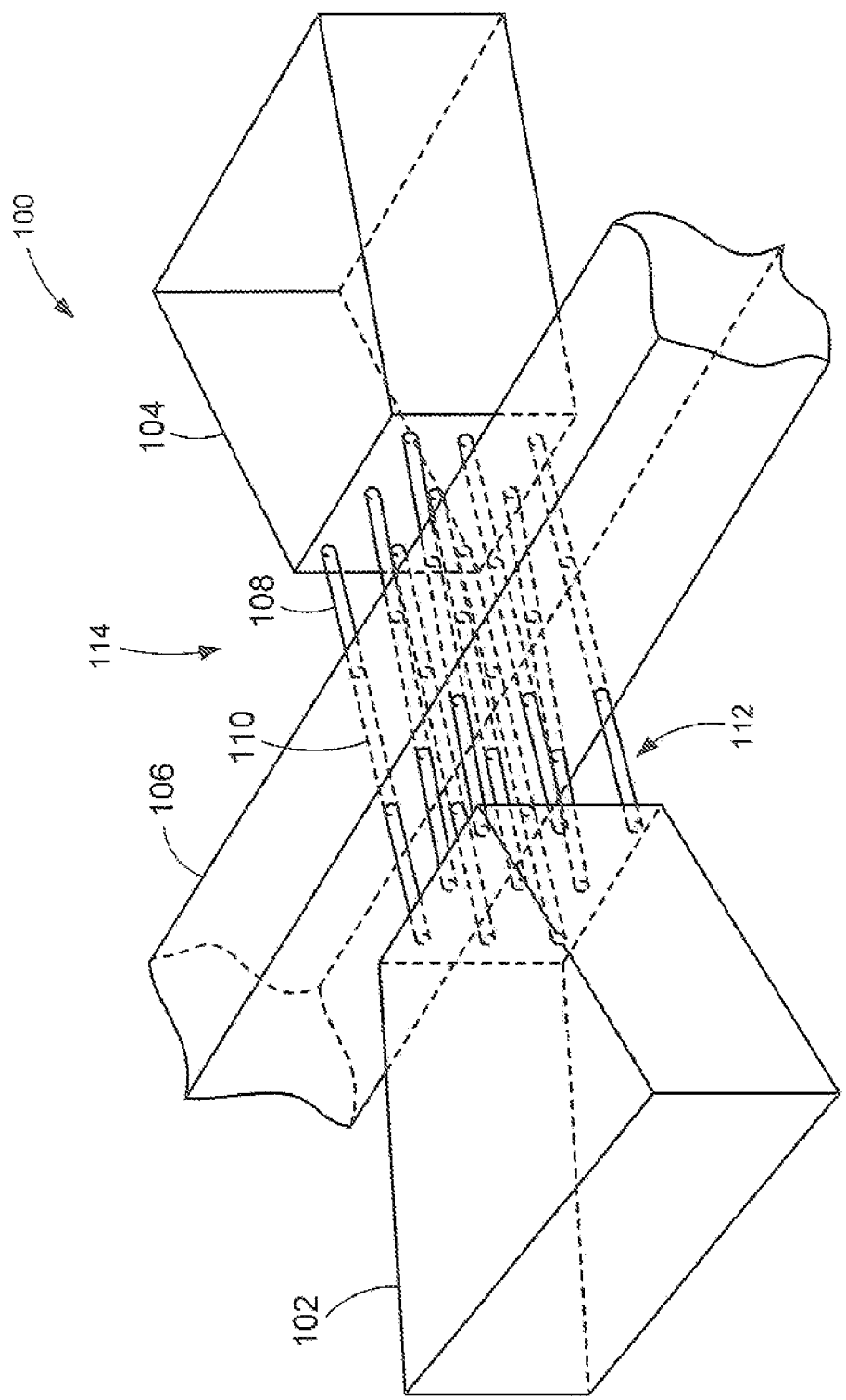
FIG. 1 illustrates an isometric view of a modulator that represents an embodiment of the present invention.

Various embodiments of the present invention are directed to nanowire-based modulators that can be used to encode information in channels of electromagnetic radiation. In the various modulator embodiments described below, a number of structurally similar components have been provided with the same reference numerals and, in the interest of brevity, an explanation of their structure and function is not repeated.

FIG. 1 illustrates an isometric view of a modulator 100 that represents an embodiment of the present invention. The modulator 100 includes a first terminal 102, a second terminal 104, a waveguide 106, and nanowires, such as nanowire 108. Each nanowire interconnects the first terminal 102 to the second terminal 104 and a portion of each nanowire is embedded in the waveguide 106. For example, the nanowire 108 interconnects the first terminal 102 to the second terminal 104 and a portion 110 of the nanowire 108 is embedded in the waveguide 106. Gaps 112 and 114 prevent the first terminal 102 and the second terminal 104 from directly contacting the waveguide 106.

Figure 2:
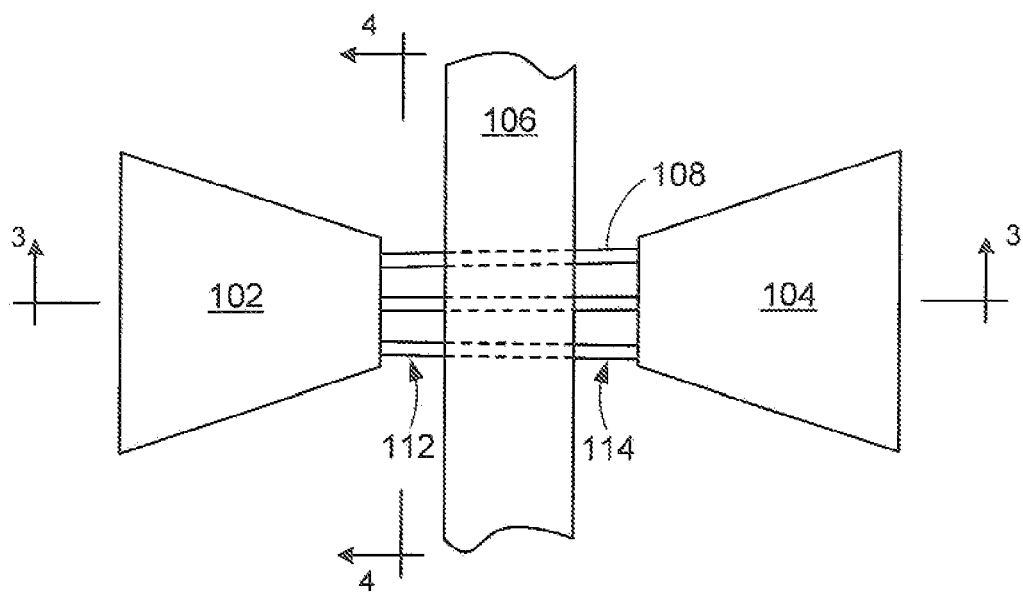
FIG. 2 illustrates a top-view of the modulator, shown in FIG. 1, that represents an embodiment of the present invention.

FIG. 2 illustrates a top-view of the modulator 100 that represents an embodiment of the present invention. As shown in FIG. 2, the gap 112 is formed between the first terminal 102 and the waveguide 106, and the gap 114 is formed between the second terminal 104 and the waveguide 106. Note that the first terminal 102 and the second terminal 104 are tapered toward the waveguide 106 in order to reduce the amount of interference between charge carriers flowing in the first terminal 102 and the second terminal 104 and the electromagnetic radiation transmitted in the waveguide 106. The cross-sectional dimensions of the nanowires interconnecting the first terminal 102 to the second terminal 104 are on the nanometer scale and the width of the waveguide 106 is on the micrometer scale. The width of the waveguide 106 needed depends on the wavelength of the channels transmitted in the waveguide 106.

Figure 3:
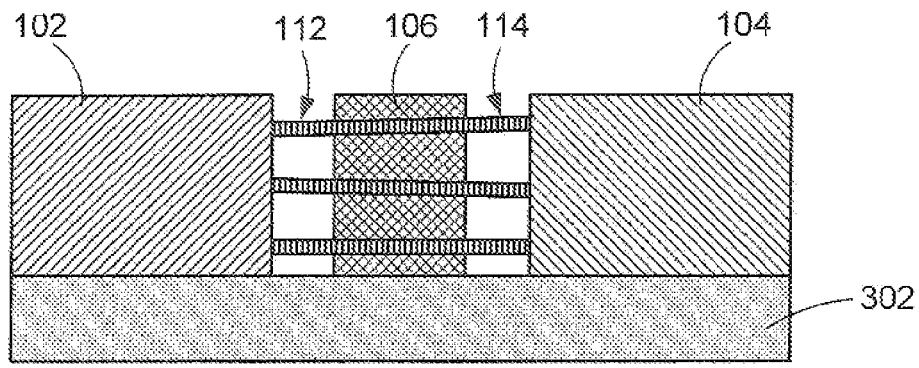
FIG. 3 illustrates a first cross-sectional view of the modulator, shown in FIG. 2, that represents an embodiment of the present invention.

FIG. 3 illustrates a cross-sectional view of the modulator 100, shown in FIG. 2, that represents an embodiment of the present invention. As shown in FIG. 3, the modulator 100 is supported by a substrate 302. The substrate 302 can be composed of an oxide, such as $SiO_2$, SiN, or any other suitable material having a refractive index smaller than the waveguide 106 and may also serve as a cladding layer.

Figure 4:
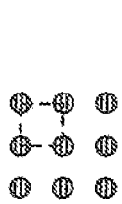
FIG. 4 illustrates a second cross-sectional view of the modulator, shown in FIG. 2, that represents an embodiment of the present invention.
Figure 5A:
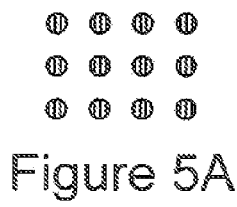
FIGS. 5A-5C illustrates cross-sectional views of nanowires in three different configurations, each representing an embodiment of the present invention.
Figure 5B:
Figure 5C:
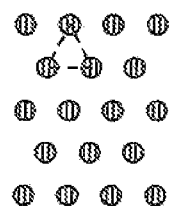

Referring to FIGS. 1-3, the nanowires interconnecting the first terminal 102 to the second terminal 104 can be composed of a semiconductor material, including silicon, germanium, or binary, ternary, or quaternary II-VI or III-V semiconductor compounds. For example, the nanowires can be composed of either ZnTe or CdSe, both II-VI semiconductor compounds, or either GaAs or InP, both III-V semiconductor compounds. The nanowires can be grown between the first terminal 102 and the second terminal 104 using epitaxial growth techniques that are well-known in the art (see e.g., "Growth and characterization of indium phosphide single-crystal nanoneedles on microcrystalline silicon surfaces," *Appl. Phys. A* (2006)). FIG. 4 illustrates a cross-sectional view of the nanowires interconnecting the first terminal 102 to the second terminal 104, shown in FIG. 2, that represents an embodiment of the present invention. As shown in FIG. 4, the nanowires are in a 3×3 configuration with a square unit cell 402. However, in other embodiments of the present invention, the nanowires can be arranged in any configuration to interconnect the first terminal 102 to the second terminal 104. For example, FIG. 5A illustrates a cross-sectional view of twelve nanowires in a 3×4 configuration with a square unit cell, and FIG. 5B illustrates a cross-sectional view of twelve nanowires in a 2×6 configuration with a square unit cell, each configuration representing an embodiment of the present invention. FIG. 5C illustrates a cross-sectional view of 20 nanowires with a triangular unit cell 502 configuration that represents an embodiment of the present invention.

Note that in other embodiments of the present invention, the number of nanowires, nanowire spacing, and configuration of nanowires may depend on a particular band of frequencies or wavelengths of the channels transmitted in the waveguide 106. Although FIGS. 4-5 show a relatively small number of nanowires interconnecting the first and second terminals 102 and 104, in other embodiments of the present invention, tens, hundreds, thousands, and even millions of nanowires may be used to interconnect the first and second terminals 102 and 104. In addition, although the nanowires in FIGS. 1-3 appear regularly spaced and substantially parallel, in other embodiments of the present invention, the nanowires can be oriented at different angles with respect to one another and can be randomly spaced between the first and second terminals 102 and 104. In other embodiments of the present invention, the nanowires can be doped with positive or negative dopants.

Referring to FIGS. 1-3, the first terminal 102 and the second terminal 104 can be composed of metal, silicide, or semiconductors, such as silicon, germanium, or binary, ternary, or quaternary II-VI or III-V semiconductor compounds, and can be fabricated using well-known chemical vapor deposition, photolithographic, or etching techniques. The type of material chosen for the first and second terminals 102 and 104 depends on the dimensions and configuration of the modulator 100 and on the band of frequencies or wavelengths of channels transmitted in the waveguide 106. The modulator 100 can be configured as a p-i-n photodiode by using doped semiconductors to form the first and second terminals 102 and 104, and an intrinsic semiconductor for the nanowires. For example, the first terminal 102 can be doped with a negative dopant, such as As, the second terminal 104 can be doped with a positive dopant, such as B. Intrinsic semiconductor nanowires serve as the depletion region between the first and second terminals 102 and 104.

Referring again to FIGS. 1-3, the waveguide 106 can be composed of any polymer material suitable for transmitting electromagnetic radiation and having a lower processing temperature than the nanowires and the first and second terminals 102 and 104. For example, the waveguide 106 can be composed of a methacrylate polymer, polycarbonate, cyclic olefin polymers, styrenic polymers, high refractive index polymers, fluorine-containing polymers, polyesters, polyethersulfone, and polyimides, just to name a few. The waveguide 106 can be fabricated using plasma enhanced chemical vapor deposition, or "spin-on" polymer techniques, which are just two of many well-known techniques that can be used to deposit polymer materials. The gaps 112 and 114 can be formed using photolithography or one of many dry etch techniques.

Figure 6:
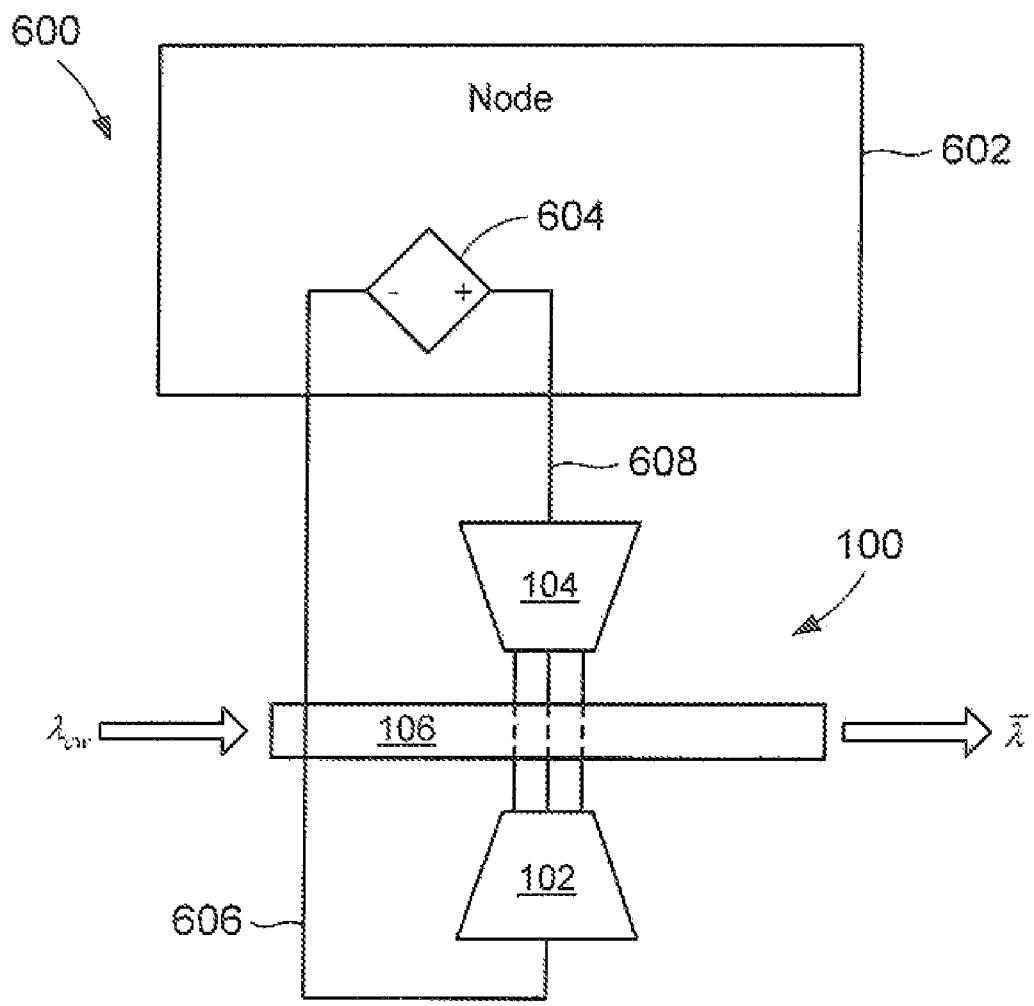
FIG. 6 illustrates a schematic representation of a first photonic integrated circuit that represents an embodiment of the present invention.

In other embodiments of the present invention, the modulator 100 can be integrated with a node to form a PIC. FIG. 6 illustrates a schematic representation of a first PIC 600 that represents an embodiment of the present invention. The PIC 600 includes a node 602, a voltage source 604, and the modulator 100. The node 602 can be memory, a sensor, a single processor, a field programmable gate array, an application specific integrated circuit, or other information generating electronic device. The first terminal 102 and the second terminal 104 are connected to the voltage source 604 via signal lines 606 and 608, respectively. The node 602 generates and/or processes information represented by bits. Each bit is equivalent to a choice between two alternatives, such as "yes"

and "no," "true" and "false," or "on" and "off" and are typically represented numerically by the binary numbers "1" and "0." The voltage source 604 receives the information encoded in electrical signals generated by the node 602 and converts the electrical signals into a corresponding voltage pattern representing the same information. While the node 602 generates information encoded in the voltage pattern, the waveguide 106 receives a carrier channel, also called a "carrier wave," represented by $\lambda_{cw}$ from carrier channel source (not shown). The carrier channel carries no significant information. As the carrier channel $\lambda_{cw}$ is transmitted through the nanowires embedded in the waveguide 106, the information encoded in the voltage pattern is encoded in the carrier channel $\lambda_{cw}$ to produce a channel $\overline{\lambda}$ encoding the same information. An information encoded channel $\overline{\lambda}$ can be generated using the modulator 100 by modulating the amplitude, frequency, or phase of the carrier channel $\lambda_{cw}$.

Figure 7A:
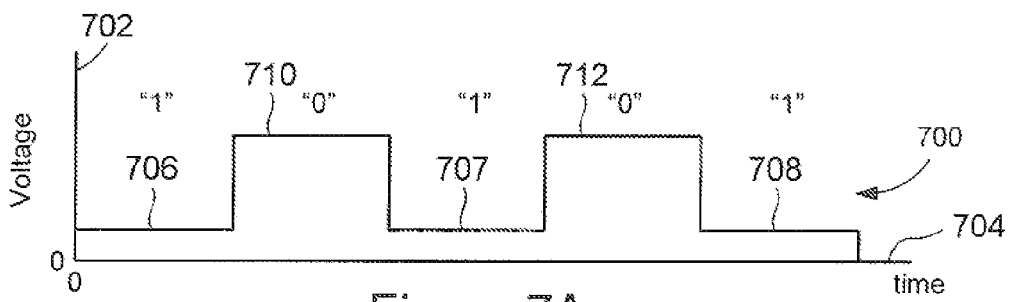
FIGS. 7A-7D show encoding information in a carrier channel that represents an embodiment of the present invention.

A description of encoding information by modulating the amplitude of a carrier channel is given below with reference to FIGS. 7A-7D. FIG. 7A shows a plot of an example voltage pattern 700 versus time. A vertical axis 702 represents the voltage, and a horizontal axis 704 represents time. The voltage pattern 700 encodes a five-digit binary number "10101" generated by a node, such as node 602. Relatively low voltage levels 706-708 correspond to the binary number "1," and relatively high voltage levels 710 and 712 correspond to the binary number "0."

The carrier channel $\lambda_{cw}$ comprises a magnetic field component and an electric field component. For the sake of simplicity, the carrier channel $\lambda_{cw}$ is represented in the following discussion by the electric field component:

$$E(z,t)=E_0 \cos(zk-\omega t)$$

where
z represents the spatial coordinate of the electric field;
$\omega$ is angular frequency;
k is a wavevector $\omega/c$;
t is time; and
$E_0$ is the electric field amplitude.

Figure 7B:
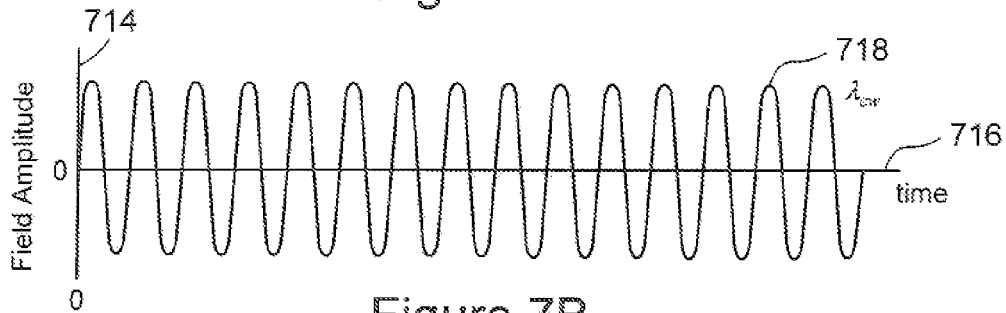

FIG. 7B shows a plot of the electric field component of a carrier channel $\lambda_{cw}$ versus time. In FIG. 7B, a vertical axis 714 corresponds to the electric field amplitude, and a horizontal axis 716 corresponds to time. A curve 718 represents the electric field component E (z,t) of the carrier channel $\lambda_{cw}$ with a regular vibrational frequency.

Figure 7C:
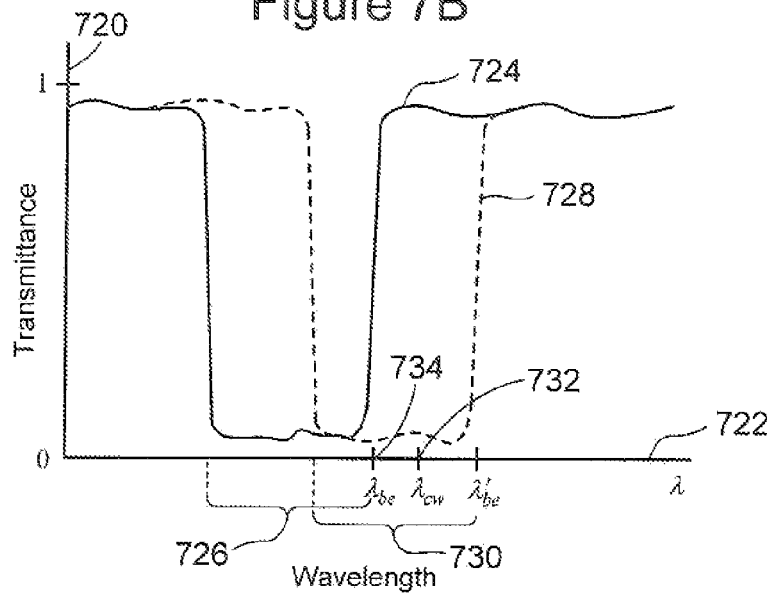

Changes in the voltage level of the voltage pattern 700 shifts the photonic bandgap of the nanowires embedded in the waveguide 106. This is commonly referred to as an "electro-absorption-type modulator". The nanowires may be grown with quantum wells to enhance electro-absorption characteristics. FIG. 7C illustrates shifting a photonic bandgap of the embedded nanowires according to changes in the voltage levels of the voltage pattern 700 shown in FIG. 7A that represents an embodiment of the present invention. In FIG. 7C, a vertical axis 720 corresponds to transmittance of electromagnetic radiation through the nanowires, and a horizontal axis 722 corresponds to a band of wavelengths of channels that can be transmitted in the waveguide 106. Transmittance (solid line) curve 724 represents transmission of carrier channels as a function of wavelength when a low voltage level is applied to the embedded nanowires. The curve 724 includes a photonic bandgap 726 corresponding to a range of wavelengths for which carrier channels are substantially restricted from transmission through the embedded nanowires. Transmittance (dashed line) curve 728 represents transmission of carrier channels as a function of wavelength when a high voltage level is applied to the embedded nanowires. In this case, the photonic bandgap 730 corresponds to a different range of wavelengths for which the carrier channels are substantially restricted from transmission through the embedded nanowires. Shifting the nanowire photonic bandgap in accordance with the voltage pattern 700 encodes the information encoded in the voltage pattern 700 by changing the amplitude of the carrier channel $\lambda_{cw}$. In order to accomplish this, as shown in FIG. 7C, the carrier channel $\lambda_{cw}$ is generated with a wavelength 732 close to the band-edge wavelength 734 of the photonic bandgap 726. When a bit of the voltage pattern 700 corresponds to a low voltage level, such as the low voltage level 706, the carrier channel $\lambda_{cw}$ wavelength 732 is outside the photonic bandgap 726 and within a high transmission region of the transmittance curve 724. As a result, the carrier channel $\lambda_{cw}$ is substantially unchanged as it is transmitted through the nanowires. However, when a bit of the voltage pattern 700 corresponds to a high voltage level, such as the high voltage level 710, the carrier channel $\lambda_{cw}$ wavelength 732 is within the photonic bandgap 730. As a result, transmission of the carrier channel $\lambda_{cw}$ through the nanowires is substantially restricted, which lowers the amplitude or strength of the carrier channel $\lambda_{cw}$.

Figure 7D:
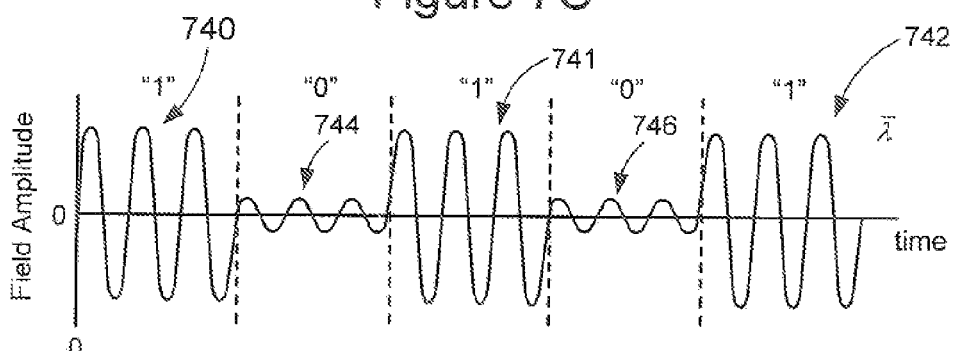

FIG. 7D illustrates an amplitude modulated channel $\overline{\lambda}$. In FIG. 7D, a single bit corresponds to four consecutive cycles of the signal, which is roughly equal to the time associated with a bit of the voltage pattern 700. The cycles 740-742 have large amplitudes, which correspond to the binary number "1" and low voltage levels 706-708, respectively, shown in FIG. 7A. These large amplitude cycles 740-742 are achieved during the time interval when the carrier channel $\lambda_{cw}$ wavelength 732 is outside the photonic bandgap 726, as described above with reference to FIG. 7C. The cycles 744 and 746 have relatively small amplitudes, which correspond to the binary number "0" and high voltage levels 706-708, respectively. These small amplitude cycles 744 and 746 are achieved during time intervals when the carrier channel $\lambda_{cw}$ wavelength 732 is inside the photonic bandgap 730, as described above with reference to FIG. 7C.

Figure 8A:
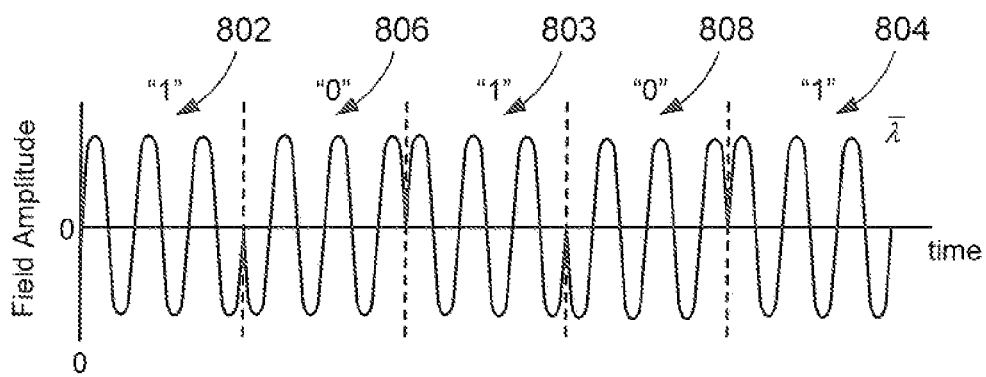
FIG. 8A illustrates an example of a phase modulated channel encoding a binary number "10101."

In another embodiment of the present invention, the information encoded in a voltage pattern can be encoded in a carrier channel $\lambda_{cw}$ by changing the electro-optic coefficient of the waveguide 106 surrounding the nanowires. Changing the electro-optic coefficient of the waveguide 106 creates a corresponding change in the refractive index of the waveguide 106 around the embedded nanowires, which, in turn, causes a phase shift in the carrier channel $\lambda_{cw}$ to produce an encoded channel $\overline{\lambda}$. Phase modulation of the carrier channel can be mathematically represented by:

$$E(z,t)=E_0 \cos(zk-\omega t+\phi)$$

where $\phi$ represents a phase shift. FIG. 8A illustrates an example of a phase modulated channel $\overline{\lambda}$ encoding of the binary number "10101." In FIG. 8A, cycles 802-804 correspond to a binary number "1" and low voltage levels 706-708, respectively. The cycles 802-804 may be achieved when a low voltage is applied, because a low voltage does not substantially affect the electro-optic coefficient of the waveguide 106. Cycles 806 and 808 include a ½ cycle phase shift from the cycles 802-804, which correspond to the binary number "0" and high voltage levels 710 and 712, respectively. The phase-shifted cycles 806 and 808 result from the high voltage levels 710 and 712 shifting the electro-optic coefficient of the waveguide 106, which slows the transmission of the carrier channel $\lambda_{cw}$ during the time periods associated with the high voltage levels.

Figure 8B:
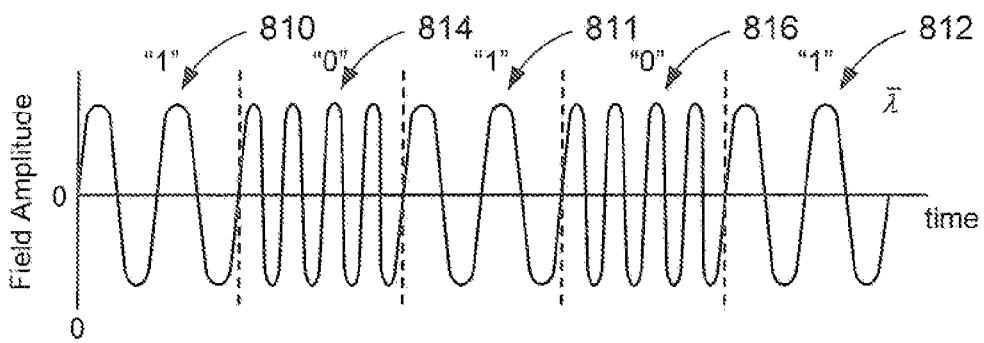
FIG. 8B illustrates an example of a frequency modulated channel encoding a binary number "10101."

In another embodiment of the present invention, the information encoded in a voltage pattern can be encoded in a carrier channel $\lambda_{cw}$ by changing the vibrational frequency of the carrier channel $\lambda_{cw}$. FIG. 8B illustrates an example of a frequency modulated channel encoding of the binary number "10101." In FIG. 8B, the lower frequency cycles 810-812 correspond to the binary number "1," and higher frequency cycles 814 and 816 correspond to the binary number "0."

Figure 9:
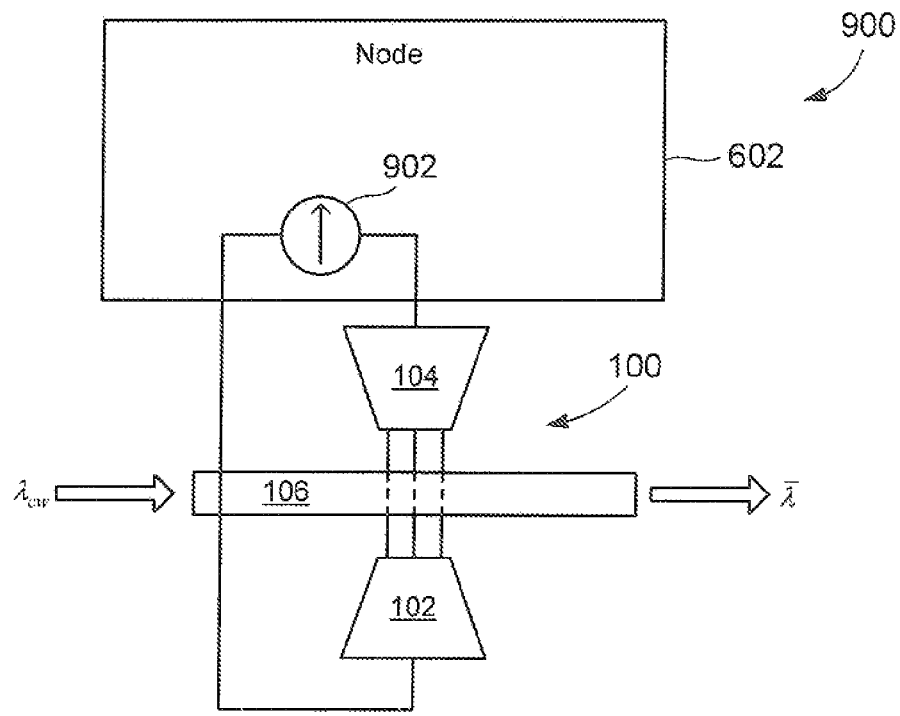
FIG. 9 illustrates a schematic representation of a second photonic integrated circuit that represents an embodiment of the present invention.

FIG. 9 illustrates a schematic representation of a second PIC 900 that represents an embodiment of the present invention. The PIC 900 includes the node 602, a current source 902, and the modulator 100. The nanowires embedded in the waveguide 106 may be doped with either a positive or negative dopant. The current source 902 transmits a current pattern, analogous to the voltage pattern 700 shown in FIG. 7A, encoding the information generated by the node 602. The current pattern flowing through the embedded nanowires changes the electro-optic coefficient of the waveguide 106 in accordance with changes in the current pattern to produce a phase modulated channel $\overline{\lambda}$, as described above with reference to FIG. 8A.

Figure 10:
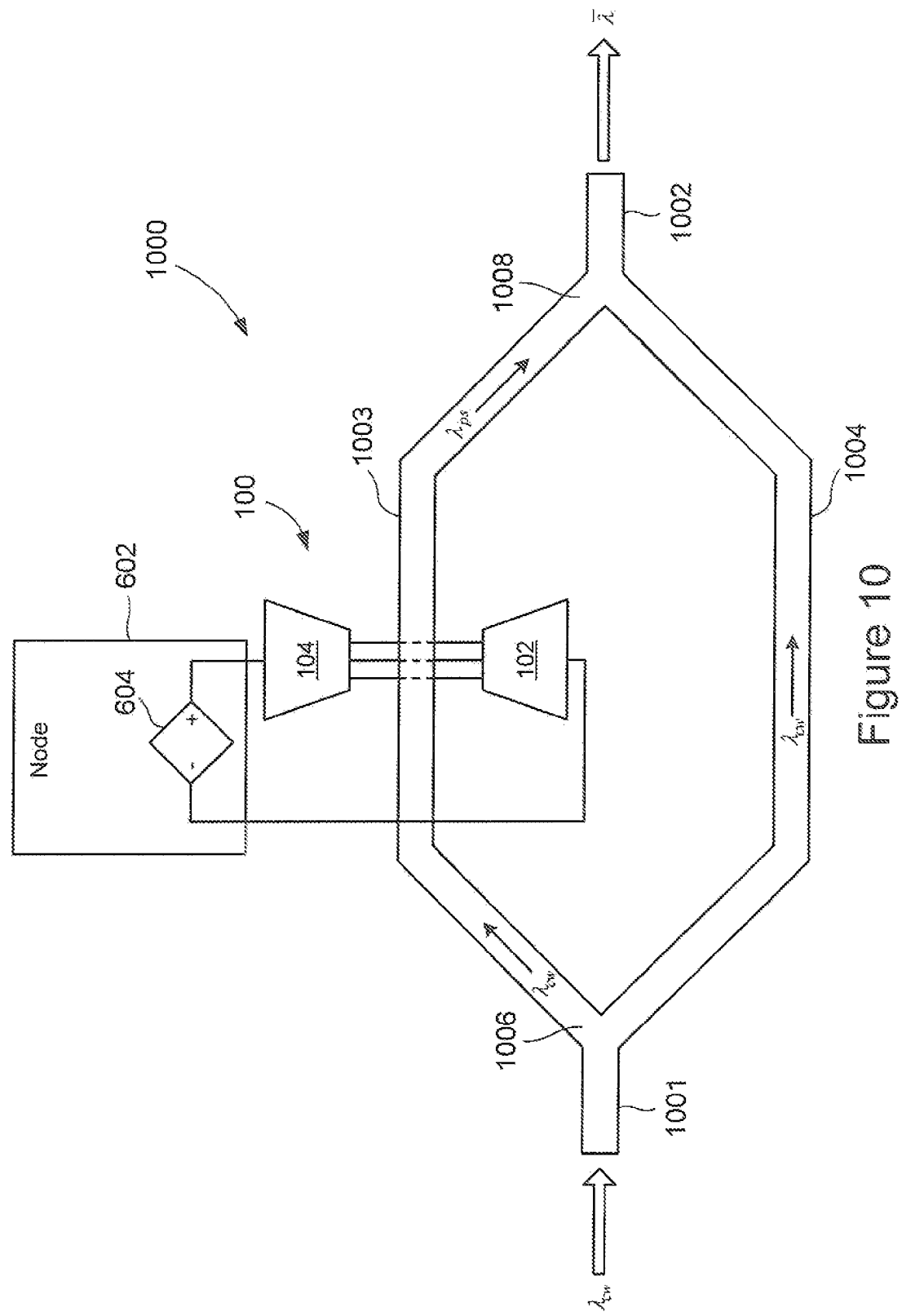
FIG. 10 illustrates a first Mach-Zehnder interferometer integrated with a node that represents an embodiment of the present invention.

In other embodiments of the present invention, a Mach-Zehnder interferometer including the modulator 100 can be used to generate a channel $\overline{\lambda}$ encoding information generated by a node. FIG. 10 illustrates a first Mach-Zehnder interferometer 1000 integrated with the node 602 that represents an embodiment of the present invention. The Mach-Zehnder interferometer 1000 includes an input waveguide 1001, an output waveguide 1002, a first internal waveguide 1003, a second internal waveguide 1004, and the modulator 100 having nanowires embedded in the first internal waveguide 1003. As shown in FIG. 10, the modulator 100 is integrated with the node 602 via the voltage source 604 as described above with reference to FIG. 6. The waveguides 1001-1004 represent ridge waveguides. The input waveguide 1001 receives a carrier channel $\lambda_{cw}$ generated by a carrier channel source (not shown). The carrier channel is split at a junction 1006 so that the carrier channel $\lambda_{cw}$ is transmitted along the internal waveguides 1003 and 1004. The modulator 100 modulates the carrier channel $\lambda_{cw}$ transmitted in the first internal waveguide 1003, as described above with reference to FIG. 8A, to produce a phase-modulated channel $\lambda_{ps}$ encoding information generated by the node 602. At the junction 1008, the phased-modulated channel $\lambda_{ps}$ and the carrier channel $\lambda_{cw}$ undergo superposition to produce a channel $\overline{\lambda}$ encoding the same information generated by the node 602.

Figure 11A:
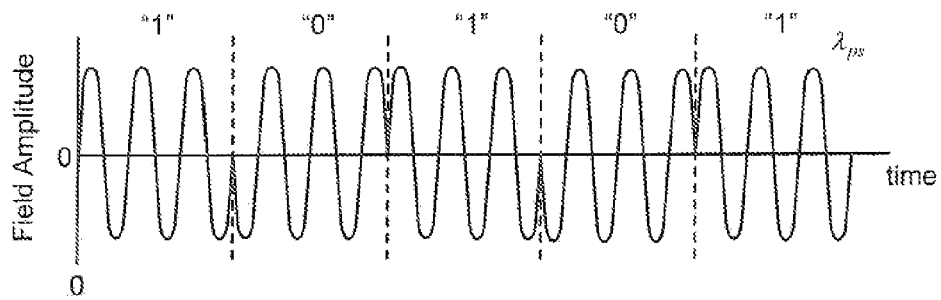
FIGS. 11A-11C illustrate conceptually superimposing a carrier channel with a phase-modulated channel at a junction of the Mach-Zehnder interferometer, shown in FIG. 10, that represents an embodiment of the present invention.
Figure 11B:
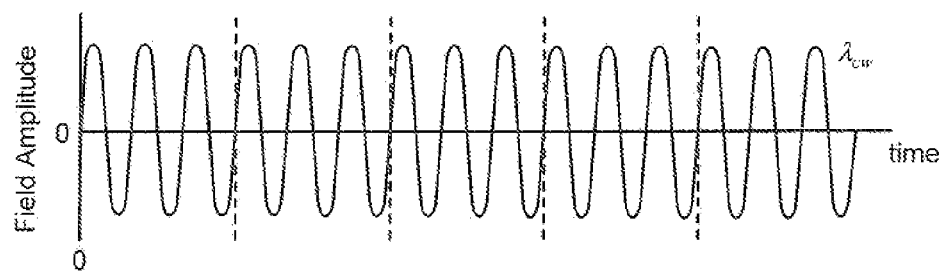
Figure 11C:
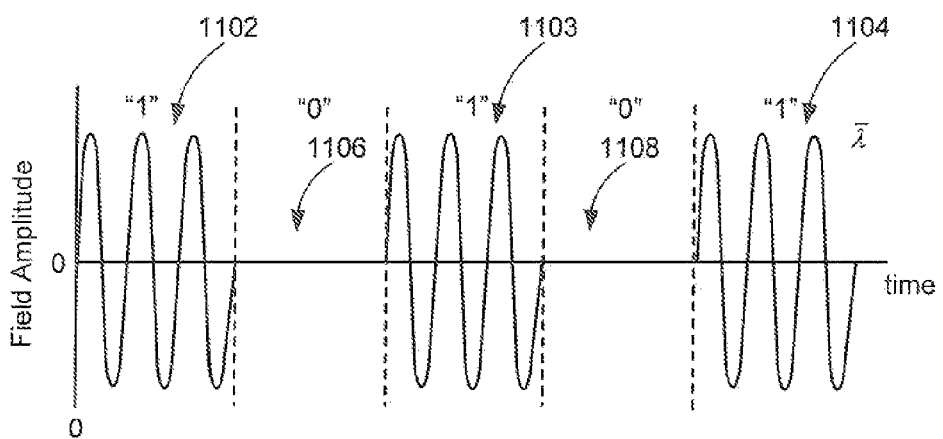

FIGS. 11A-11C illustrates conceptually superimposing the carrier channel $\lambda_{cw}$ with the phased-modulated channel $\lambda_{ps}$ at the junction 1008 to produce the encoded channel $\overline{\lambda}$ that represents an embodiment of the present invention. FIG. 11A shows the phase-modulated channel $\lambda_{ps}$ transmitted in the first waveguide 1003, as described above with reference to FIG. 8A. FIG. 11B shows the carrier channel $\lambda_{cw}$ transmitted in the second waveguide 1004. FIG. 11C shows the encoded channel $\overline{\lambda}$ resulting from superimposing the carrier channel $\lambda_{cw}$ with the phased-modulated channel $\lambda_{ps}$ at the junction 1008. In FIG. 11C, cycles 1102-1104 correspond to constructive interference between the phase-modulated channel $\lambda_{ps}$ and the carrier channel $\lambda_{cw}$ over the time intervals where the phase of the phase-modulated channel $\lambda_{ps}$ matches the phase of the carrier channel $\lambda_{cw}$ and correspond to the binary number "1." On the other hand, cycles 1106 and 1108 correspond to destructive interference between the phase-modulated channel $\lambda_{ps}$ and the carrier channel $\lambda_{cw}$ over the time intervals where a ½ cycle phase difference exist between the phase of the phase-modulated channel $\lambda_{ps}$ and the phase of the carrier channel $\lambda_{cw}$ and correspond to the binary number "0."

Figure 12:
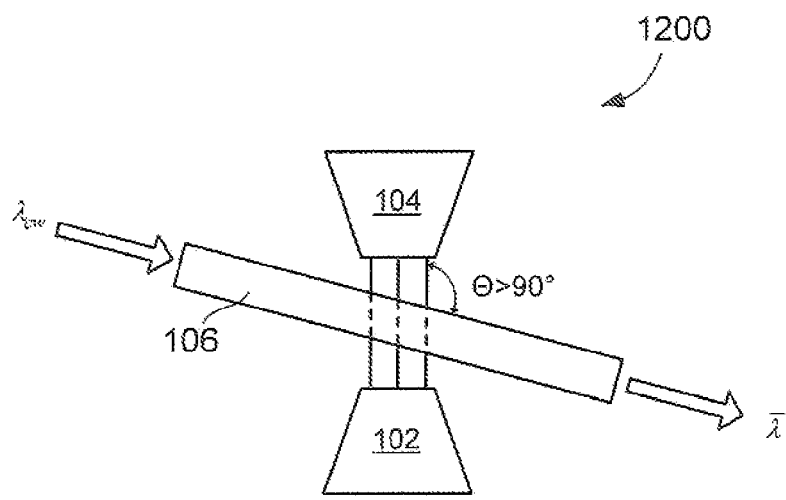
FIG. 12 illustrates a modulator with nanowires embedded in a waveguide that represents an embodiment of the present invention.
Figure 13A:
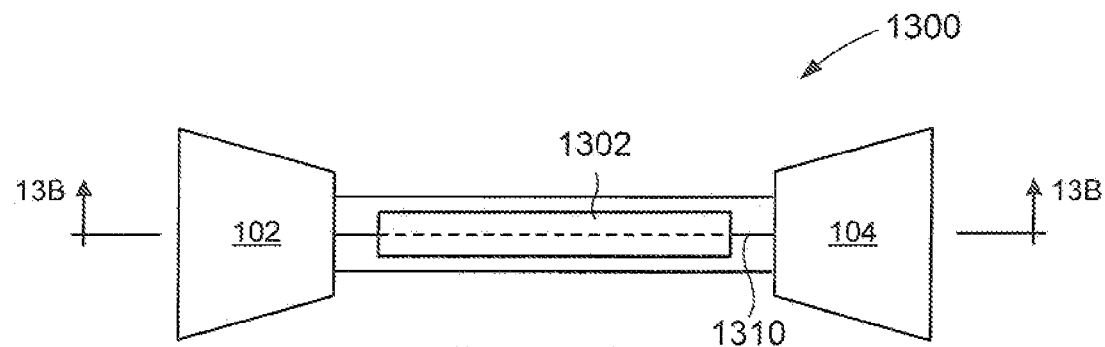
FIGS. 13A-13B illustrates a modulator with a waveguide substantially parallel to nanowires interconnecting a first terminal to a second terminal that represents an embodiment of the present invention.
Figure 13B:
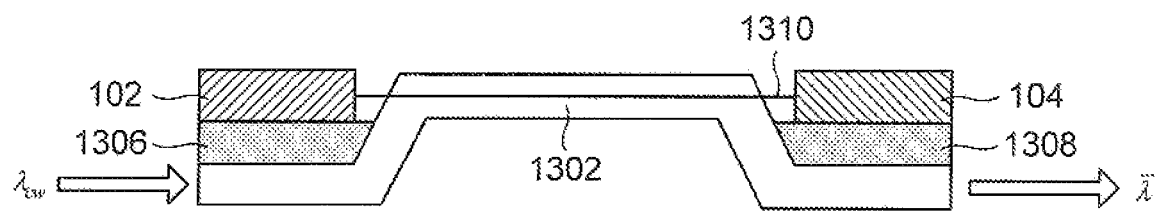

Although the present invention has been described in terms of particular embodiments, it is not intended that the invention be limited to these embodiments. Modifications within the spirit of the invention will be apparent to those skilled in the art. For example, it would be obvious to one of ordinary skill in the art to operatively couple nanowires with a waveguide in any number of ways. For example, the nanowires shown in FIGS. 1-3 appear substantially perpendicular to the waveguide 106. However, in other embodiments of the present invention, the nanowires can be at any angle with respect to the waveguide 106. FIG. 12 illustrates a modulator 1200 with nanowires embedded in the waveguide 106 at an angle θ greater than 90° that represents an embodiment of the present invention. In other embodiments of the present invention, the nanowires can also be operatively coupled to the waveguide by located the nanowires either above and/or below the waveguide and not actually embedded within the waveguide. In still other embodiments of the present invention, a number of the nanowires can be embedded in the waveguide and a number of other nanowires can be located in proximity to the waveguide. For example, FIG. 13A illustrates a modulator 1300 that represents another embodiment of the present invention. In FIG. 13A, a nanowire 1310 is embedded in the waveguide 1302, and the remaining two nanowires are located proximal to the waveguide 1302. FIG. 13B illustrates a cross-sectional view of the modulator 1300, shown in FIG. 13A, that represents an embodiment of the present invention. As shown in FIG. 13B, portions of the waveguide 1302 are separated from the first and second terminals 102 and 104 by substrates 1304 and 1306, respectively. The substrates 1304 and 1306 can be $SiO_2$, SiN, or any other suitable substrate. In other embodiments of the present invention, the central nanowire 1308 may be located above the waveguide 1302.

Figure 14:
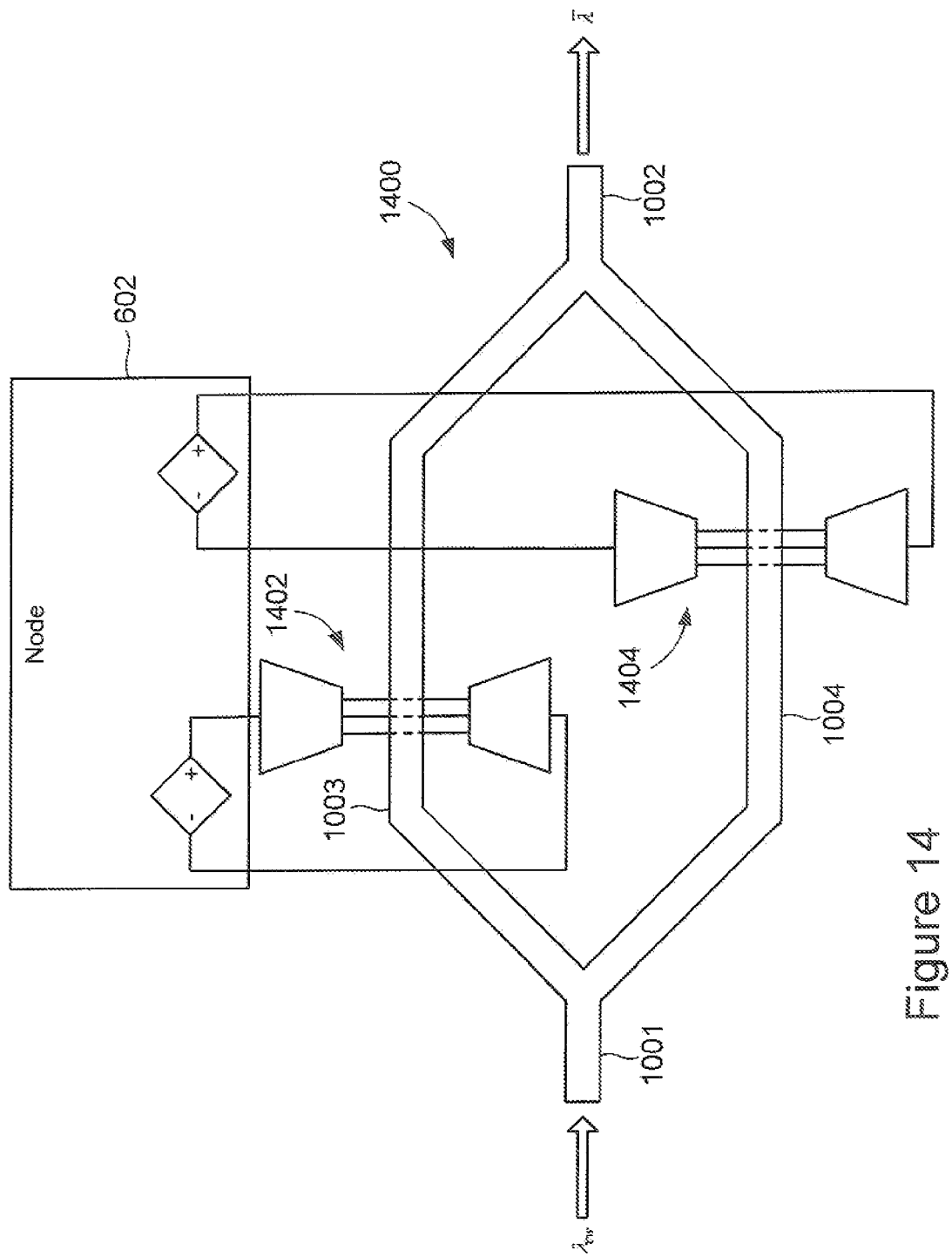
FIG. 14 illustrates a second Mach-Zehnder interferometer integrated with a node that represents another embodiment of the present invention.

FIG. 14 illustrates a second Mach-Zehnder interferometer 1400 integrated with the node 602 that represents another embodiment of the present invention. The Mach-Zehnder interferometer 1400 includes a first modulator 1402 and a second modulator 1404. The modulators 1402 and 1404 can be used to simultaneously shift the phase of the carrier channels transmitted in the corresponding intermediate waveguides 1003 and 1004 in order to produce an encoded channel $\overline{\lambda}$.

Figure 15A:
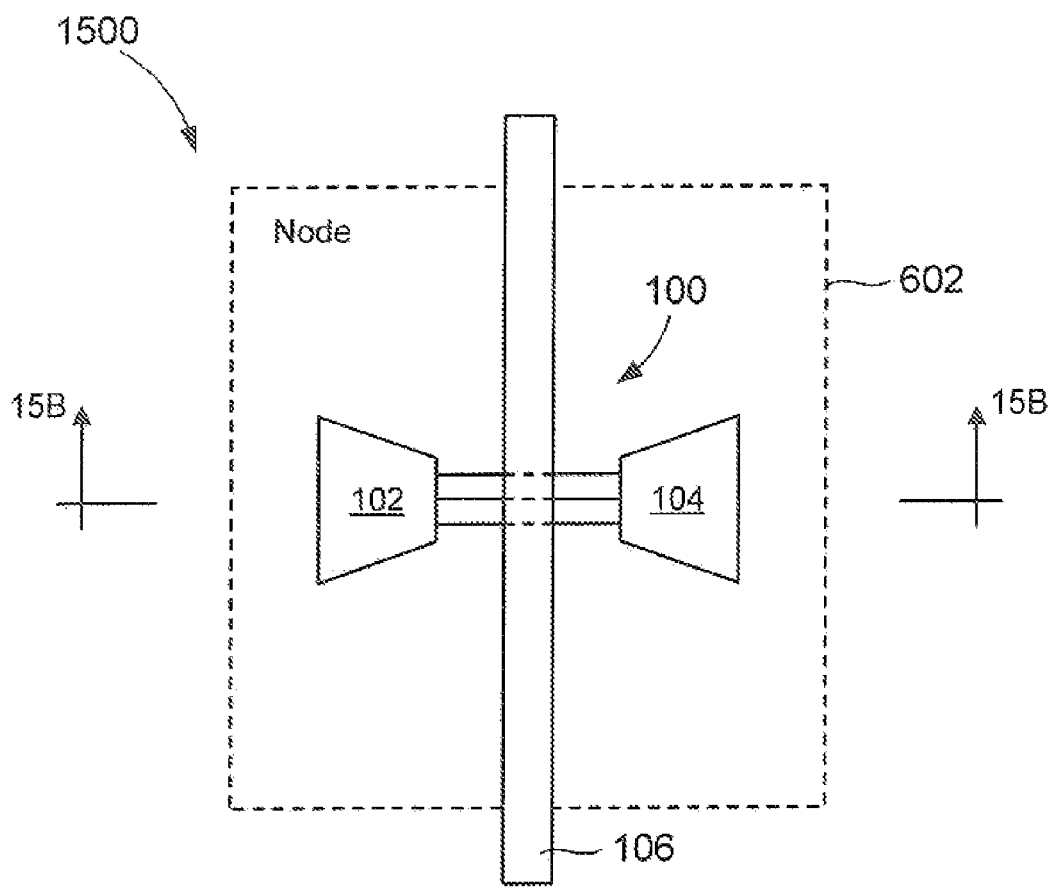
FIGS. 15A-15B illustrates a schematic representation of a third photonic integrated circuit that represents an embodiment of the present invention.
Figure 15B:
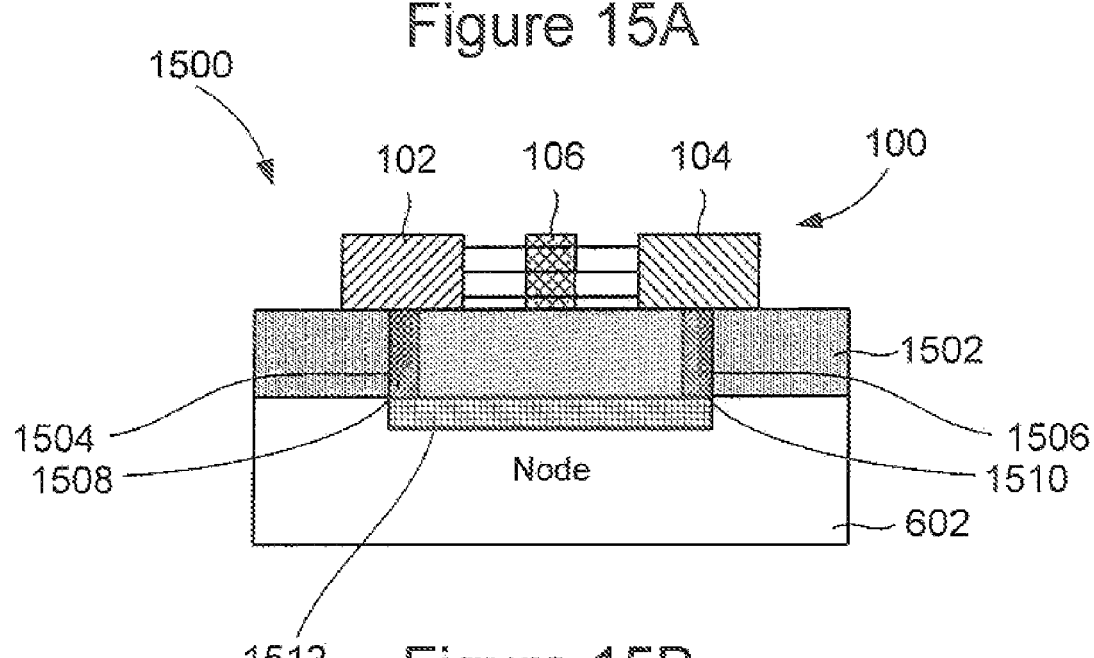

FIG. 15A illustrates a PIC 1500 that represents another embodiment of the present invention. As shown in FIG. 15A, the PIC 1500 includes the node 602, identified by dashed lines, which is located beneath the modulator 100. The node 602 and the modulator 100 can be separated by a substrate. The first terminal 102 and the second terminals 104 are connected to the node 602 through interconnects (not shown). FIG. 15B illustrates a cross-sectional view of the PIC 1500, shown in FIG. 15A, that represents an embodiment of the present invention. As shown in FIG. 15B, the first terminal 102, the second terminal 104, and the waveguide 106 are supported by a substrate 1502 that separates the modulator 100 from the node 602. The substrate 1502 can be composed of $SiO_2$, SiN, or any other material suitable for insulating the first terminal 102 and the second terminal 104 from the electronic devices comprising the node 602. The substrate 1502 may also serve as a cladding layer for the waveguide 106. The substrate 1502 includes vias 1504 and 1506 that span the height of the substrate 1502 and are located beneath the first terminal 102 and the second terminal 104, respectively. Conductors 1508 and 1510 fill the vias 1504 and 1506, respectively, and operate as through substrate interconnects so that a voltage or current source 1512 can encode information in carrier channels transmitted in the waveguide 106.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A modulator comprising:
    a waveguide configured to transmit one or more channels of electromagnetic radiation;
    a first terminal and a second terminal the first terminal and the second terminal positioned on opposite sides of the waveguide; and
    a number of nanowires, wherein the nanowires are randomly spaced and randomly oriented and each nanowire interconnects the first terminal to the second terminal, a portion of each nanowire is operatively coupled to the waveguide, and wherein the nanowires are configured to modulate the one or more channels when an electrical signal is applied to the first and second terminals, the electrical signal causing electro-absorption of the one or more channels at the nanowires.

2. The modulator of claim 1 wherein the waveguide further comprises a polymer.

3. The modulator of claim 1 wherein the first terminal and the second terminal further comprise one of:
    silicon;
    germanium;
    a III-V semiconductor;
    a II-VI semiconductor;
    a metal; and
    a silicide.

4. The modulator of claim 1 wherein the first terminal and the second terminal arc connected to one of:
    memory;
    a sensor;
    a processor;
    a field programmable gate array; and
    an application specific integrated circuit.

5. The modulator of claim 1 wherein the nanowires further comprise one of:
    silicon;
    germanium;
    a III-V semiconductor; and
    a II-VI semiconductor.

6. The modulator of claim 1 wherein the nanowire operatively coupled to the waveguide further comprises one of:
    the nanowires is embedded in the waveguide; and
    the nanowires located proximal to the waveguide.

7. The modulator of claim 1 wherein the nanowires modulate the one or more channels further comprises one or more of:
    amplitude modulation;
    phase modulation; and
    frequency modulation.

8. The modulator of claim 1 wherein the electrical signal further comprises one of:
    a voltage; and
    a current.

9. An integrated, circuit including a modulator configured in accordance with claim 1.

10. A Mach-Zehnder interferometer including one or more modulators configured in accordance with claim 1.

11. The modulator of claim 1 wherein the nanowires are doped with a p-type dopant.

12. The modulator of claim 1 wherein the nanowires are doped with an n-type dopant.

13. The modulator of claim 1 wherein the nanowires further comprise an intrinsic semiconductor, the first terminal further comprises an n-type semiconductor, and the second terminal further comprises a p-type semiconductor.

14. The modulator of claim 1 wherein the nanowires modulate the one or more channels when an electrical signal of appreciable magnitude is applied to the first terminal and the second terminal further comprises changing the refractive index of waveguide surrounding the nanowires.

15. The modulator of claim 1 wherein the nanowires modulate the one or more channels when an electrical signal of appreciable magnitude is applied to the first terminal and the second terminal further comprises changing the refractive index of the nanowires.

16. A method for encoding information in a channel of electromagnetic radiation, the method comprising:
    transmitting the channel in a waveguide;
    encoding information in the channel by applying an electrical signal pattern encoding the same information across randomly spaced and randomly oriented nanowires embedded in the waveguide, wherein the electrical signal pattern causes electro-absorption of the channel within the nanowires; and
    transmitting the channel encoding the information in the waveguide.

17. The modulator of claim 16 wherein the nanowires further comprise an intrinsic semiconductor, p-type semiconductor, or an n-type semiconductor.

18. The method of claim 16 wherein the first terminal and the second terminal further comprise one of:
    silicon;
    germanium;
    a III-V semiconductor;
    a II-VI semiconductor;
    a metal; and
    a silicide.

19. The method of claim 16 wherein the nanowires further comprise one of:
    silicon;
    germanium;
    a III-V semiconductor; and
    a II-VI semiconductor.

20. The method of claim 16 wherein the node further comprises one of:
    memory;
    a sensor;
    a processor;
    a field programmable gate array; and
    an application specific integrated circuit.

* * * * *

UNITED STATES PATENT AND TRADEMARK OFFICE
CERTIFICATE OF CORRECTION

PATENT NO.          : 7,711,213 B2                                                Page 1 of 1
APPLICATION NO.  : 11/699092
DATED                  : May 4, 2010
INVENTOR(S)         : Shih-Yuan Wang et al.

It is certified that error appears in the above-identified patent and that said Letters Patent is hereby corrected as shown below:

In column 9, line 25, in Claim 1, delete "second terminal" and insert -- second terminal, --, therefor.

In column 9, line 48, in Claim 4, delete "arc" and insert -- are --, therefor.

In column 10, line 8, in Claim 9, delete "integrated," and insert -- integrated --, therefor.

Signed and Sealed this

Twelfth Day of October, 2010

David J. Kappos
*Director of the United States Patent and Trademark Office*